(12) United States Patent
Wei et al.

(10) Patent No.: US 8,001,769 B2
(45) Date of Patent: Aug. 23, 2011

(54) CONTROL OF SCR SYSTEM HAVING A FILTERING DEVICE

(75) Inventors: Zhiyong Wei, Chicago, IL (US); Theodore M. Kostek, San Antonio, TX (US); Christopher Alan Sharp, San Antonio, TX (US)

(73) Assignee: Caterpillar Inc., Peoria, IL (US)

( * ) Notice: Subject to any disclaimer, the term of this patent is extended or adjusted under 35 U.S.C. 154(b) by 1035 days.

(21) Appl. No.: 11/892,132

(22) Filed: Aug. 20, 2007

(65) Prior Publication Data
US 2009/0049828 A1 Feb. 26, 2009

(51) Int. Cl.
*F01N 3/00* (2006.01)
(52) U.S. Cl. .......... 60/286; 60/274; 60/284; 60/295; 60/301; 60/285
(58) Field of Classification Search .......... 60/273, 60/274, 284–287, 295, 299–301, 303
See application file for complete search history.

(56) References Cited

U.S. PATENT DOCUMENTS

| | | | |
|---|---|---|---|
| 4,314,345 A | 2/1982 | Shiraishi et al. | |
| 5,628,186 A * | 5/1997 | Schmelz | 60/274 |
| 5,833,932 A | 11/1998 | Schmelz | |
| 5,948,723 A | 9/1999 | Sung | |
| 6,125,629 A | 10/2000 | Patchett | |
| 6,415,602 B1 | 7/2002 | Patchett et al. | |
| 6,446,430 B1 | 9/2002 | Roth et al. | |
| 6,536,210 B1 | 3/2003 | Komoriya et al. | |
| 6,662,553 B2 | 12/2003 | Patchett et al. | |
| 6,681,565 B2 | 1/2004 | Russell | |
| 6,732,507 B1 | 5/2004 | Stanglmaier et al. | |
| 6,823,660 B2 | 11/2004 | Minami | |
| 6,826,906 B2 | 12/2004 | Kakwani et al. | |
| 6,871,489 B2 | 3/2005 | Tumati et al. | |

(Continued)

FOREIGN PATENT DOCUMENTS
WO 9955446 11/1999
(Continued)

OTHER PUBLICATIONS

Schär et al., "Mean-Value Model of the SCR System of a Mobile Application," IFAC, 15$^{th}$ Triennial World Congress, Barcelona, Spain, 2002.

(Continued)

*Primary Examiner* — Thomas E Denion
*Assistant Examiner* — Jesse Bogue
(74) *Attorney, Agent, or Firm* — Finnegan, Henderson, Farabow, Garrett & Dunner LLP

(57) ABSTRACT

An emissions control system is disclosed. The emissions control system may have a power source that creates a flow of exhaust and a filtering device that receives the flow of exhaust. A first sensor may be located at or upstream of the filtering device, the first sensor being configured to measure a first temperature, and an SCR catalyst may be located downstream of the filtering device. The emissions control system may also have an injector configured to inject a reduction agent into the flow of exhaust in the presence of the SCR catalyst. The emissions control system may further have a controller in communication with the first sensor. The controller may be configured to predict a change in an ability of the SCR catalyst to store reduction agent using a measured change in the first temperature and adjust the injector according to the predicted change in the storage ability of the SCR catalyst.

18 Claims, 3 Drawing Sheets

U.S. PATENT DOCUMENTS

| | | | |
|---|---|---|---|
| 6,871,490 B2 | 3/2005 | Liang et al. | |
| 6,882,929 B2 | 4/2005 | Liang et al. | |
| 6,928,806 B2 | 8/2005 | Tennison et al. | |
| 6,996,975 B2 | 2/2006 | Radhamohan et al. | |
| 7,005,116 B2 | 2/2006 | Schäfer-Sindlinger et al. | |
| 7,055,313 B2 | 6/2006 | Russell | |
| 7,065,958 B2 | 6/2006 | Funk et al. | |
| 7,093,427 B2 * | 8/2006 | van Nieuwstadt et al. | 60/286 |
| 7,150,145 B2 | 12/2006 | Patchett et al. | |
| 7,155,331 B1 | 12/2006 | Zhang et al. | |
| 7,168,947 B2 | 1/2007 | Zamansky et al. | |
| 7,200,990 B2 | 4/2007 | Gabrielsson et al. | |
| 7,210,288 B2 * | 5/2007 | Bandl-Konrad et al. | 60/297 |
| 2005/0069476 A1 * | 3/2005 | Blakeman et al. | 423/239.1 |
| 2006/0042234 A1 | 3/2006 | Song et al. | |
| 2006/0045801 A1 | 3/2006 | Boyden et al. | |
| 2006/0047366 A1 | 3/2006 | Boyden et al. | |
| 2006/0086080 A1 | 4/2006 | Katogi et al. | |
| 2006/0130461 A1 | 6/2006 | Gabrielsson | |
| 2006/0196285 A1 | 9/2006 | Steen et al. | |
| 2007/0042495 A1 | 2/2007 | Pavlova-MacKinnon et al. | |
| 2007/0144152 A1 * | 6/2007 | Lueders | 60/286 |
| 2007/0157608 A1 * | 7/2007 | Gandhi et al. | 60/286 |

FOREIGN PATENT DOCUMENTS

| | | |
|---|---|---|
| WO | 0214657 | 2/2002 |
| WO | 0233232 | 4/2002 |
| WO | 2004022935 | 3/2004 |
| WO | 2004061278 | 7/2004 |
| WO | WO 2006/021748 A1 | 3/2006 |

OTHER PUBLICATIONS

U.S. Appl. No. 11/882,218, filed Jul. 31, 2007, "SCR Emissions Control System," pp. 1-16, Figs. 1-2.

Schär et al., "Control of a Urea SCR Catalytic Converter System for a Mobile Heavy Duty Diesel Engine," SAE International, 2003-01-0776, Mar. 3-6, 2003.

Schär et al., "Control-Oriented Model of an SCR Catalytic Converter System," SAE International, 2004-01-0153, Mar. 8-11, 2004.

Chi et al., "Modeling and Control of a Urea-SCR Aftertreatment System," SAE International, 2005-01-0966, Apr. 11-14, 2005.

Willems et al., "Is Closed-Loop SCR Control Required to Meet Future Emission Targets?" SAE International, 2007-01-1574, Apr. 16-19, 2007.

* cited by examiner

CONTROL OF SCR SYSTEM HAVING A FILTERING DEVICE

TECHNICAL FIELD

The present disclosure relates generally to a control system for an SCR process, and more particularly, to a control system that controls an amount of injected reduction agent based on a temperature measured at or upstream of a filtering device.

BACKGROUND

Engine exhaust emissions are becoming increasingly important for engine manufacturers. Governments and regulatory agencies are enforcing ever more stringent emissions standards for many types of on-highway and off-highway vehicles. The amount of pollutants in an exhaust flow emitted from the vehicle's engine must be regulated depending on the type, size, and/or class of engine. Manufacturers must develop new technologies to meet these standards while providing high-performance, cost-effective equipment to consumers.

One method implemented by engine manufacturers to comply with the regulation of exhaust flow pollutants is the use of a selective catalytic reduction ("SCR") catalyst to clean nitrogen oxides ("NOx") from the engine exhaust flow. An SCR system works by releasing a reductant, such as ammonia ("$NH_3$"), into the engine exhaust flow in the presence of a catalyst. The $NH_3$ may be stored on the surface coating of the catalyst where it reacts with the NOx in the exhaust flow to create environmentally friendly products, such as nitrogen gas ("$N_2$") and water ("$H_2O$"). The chemical reactions of the SCR process can be represented by:

  (1)

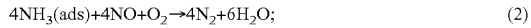  (2)

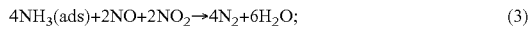  (3)

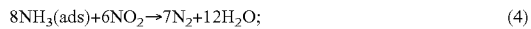  (4)

  (5)

Reaction (1) describes the ammonia adsorption/desorption from the catalyst, Reactions (2)-(4) are "DeNOx" reactions that describe the reaction between the reductant and the NOx in the presence of the catalyst, and Reaction (5) describes the oxidation of the ammonia.

In general, manufactures seek to maximize the amount of NOx in the exhaust flow converted to $H_2O$ and $N_2$. To achieve this, the amount of $NH_3$ stored on the catalyst's surface may be increased. However, $NH_3$ may also be desorbed from the catalyst and carried by the exhaust flow downstream of the catalyst to a location where the $NH_3$ is released into the atmosphere (i.e., slip). $NH_3$ slip is undesirable because the unreacted $NH_3$ is released into the atmosphere and wasted. The $NH_3$ desorption rate is strongly dependent on the catalyst's temperature. As the temperature of the catalyst increases, the desorption rate of $NH_3$ from the catalyst's surface increases exponentially.

Unlike industrial or stationary SCR applications where engines or turbines generally operate at steady state conditions, mobile SCR systems used for on-highway trucks and off-road machines are subject to transient engine speeds and loads. The transient engine speeds and loads lead to a time varying exhaust temperature, and thus a time varying catalyst desorption rate. Automatic control has been used as one method of attempting to handle transient changes in the exhaust gas temperature, while still maintaining a good NOx conversion and avoiding slip.

One method of controlling an SCR process is described in U.S. Pat. No. 7,200,990 (the '990 patent) issued to Gabrielsson et al. on Apr. 10, 2007. Specifically, the '990 patent discloses a method for controlling injection of a reductant into an NOx containing exhaust gas stream from a combustion engine. Step 1 of the method is a stoichiometric calculation of the amount of NOx created by the combustion. The calculation is based on measurement of air to combustion, measurement of $O_2$ content in the exhaust gas, and NOx content. Step 2 calculates the maximum possible or wanted NOx conversion based on the same three measurements as step 1 plus measurement of a temperature of the exhaust gas inlet and outlet of the catalyst (i.e., upstream and downstream of the catalyst, respectively). Results from steps 1 and 2 are used in step 3 to obtain the theoretically required amount of urea solution to be injected at a certain moment.

This theoretical amount is further adjusted in an event based filter, step 4, based on measurement of exhaust gas temperature inlet of the catalyst, air flow measurement, $O_2$ measurement, and on determination of exhaust gas flow as in step 2 in order to avoid leakage of ammonia or NOx during transient conditions. The amount of ammonia adsorbed on the catalyst surface changes especially with changes in exhaust gas flow and temperature. The filter takes into consideration the historical data of the catalyst in order to foresee the $NH_3$ adsorption/desorption capacity of the catalyst. If the conditions of the catalyst are such that a large desorption of ammonia can occur, then part of the calculated (step 3) urea injection is retained and stored in the memory of the injection algorithm. On the other hand, if the conditions are favorable for the adsorption of $NH_3$ on the catalyst, then the actual urea injection can be increased until the amount of urea as stored in the memory is used up.

Although the '990 patent may outline a method of controlling injection of a reductant based on the temperature of the exhaust gas inlet and outlet of the catalyst, the results produced by the control system may be suboptimal. For example, the engine may create favorable conditions, thus causing the control system to store a larger amount of urea. However, a sudden increase in engine load and/or speed may create a sharp increase in the temperature of the exhaust gas. This sharp increase in the exhaust gas temperature may heat the catalyst and significantly increase desorption of the stored urea. Due to the rapid speed at which the heated exhaust gas may travel and a time lag created by the injection, absorption, and desorption processes, even immediately modifying the amount of injected urea upon sensing a temperature change upstream of the catalyst may not be sufficient to prevent the slip of the already stored urea.

The present disclosure is directed at overcoming one or more of the problems set forth above.

SUMMARY OF THE DISCLOSURE

In one aspect, the present disclosure is directed to an emissions control system. The emissions control system may include a power source that creates a flow of exhaust and a filtering device that receives the flow of exhaust. A first sensor may be located at or upstream of the filtering device, the first sensor being configured to measure a first temperature, and an SCR catalyst may be located downstream of the filtering device. The emissions control system may also include an injector configured to inject a reduction agent into the flow of exhaust in the presence of the SCR catalyst. The emissions control system may further include a controller in communication with the first sensor. The controller may be configured to predict a change in an ability of the SCR catalyst to store reduction agent using a measured change in the first temperature and adjust the injector according to the predicted change in the storage ability of the SCR catalyst.

In another aspect, the present disclosure is directed to a method of controlling an SCR process. The method may include creating a flow of exhaust and communicating the flow of exhaust to a filtering device. The method may also include measuring a first temperature at or upstream of the filtering device and injecting a reduction agent for reaction with the flow of exhaust in the presence of an SCR catalyst. The SCR catalyst may be located downstream of the filtering device. The method may further include predicting a change in an ability of the SCR catalyst to store reduction agent using a measured change in the first temperature and controlling the injection of the reduction agent according to the predicted change in the storage ability of the SCR catalyst.

DETAILED DESCRIPTION

Figure 1:
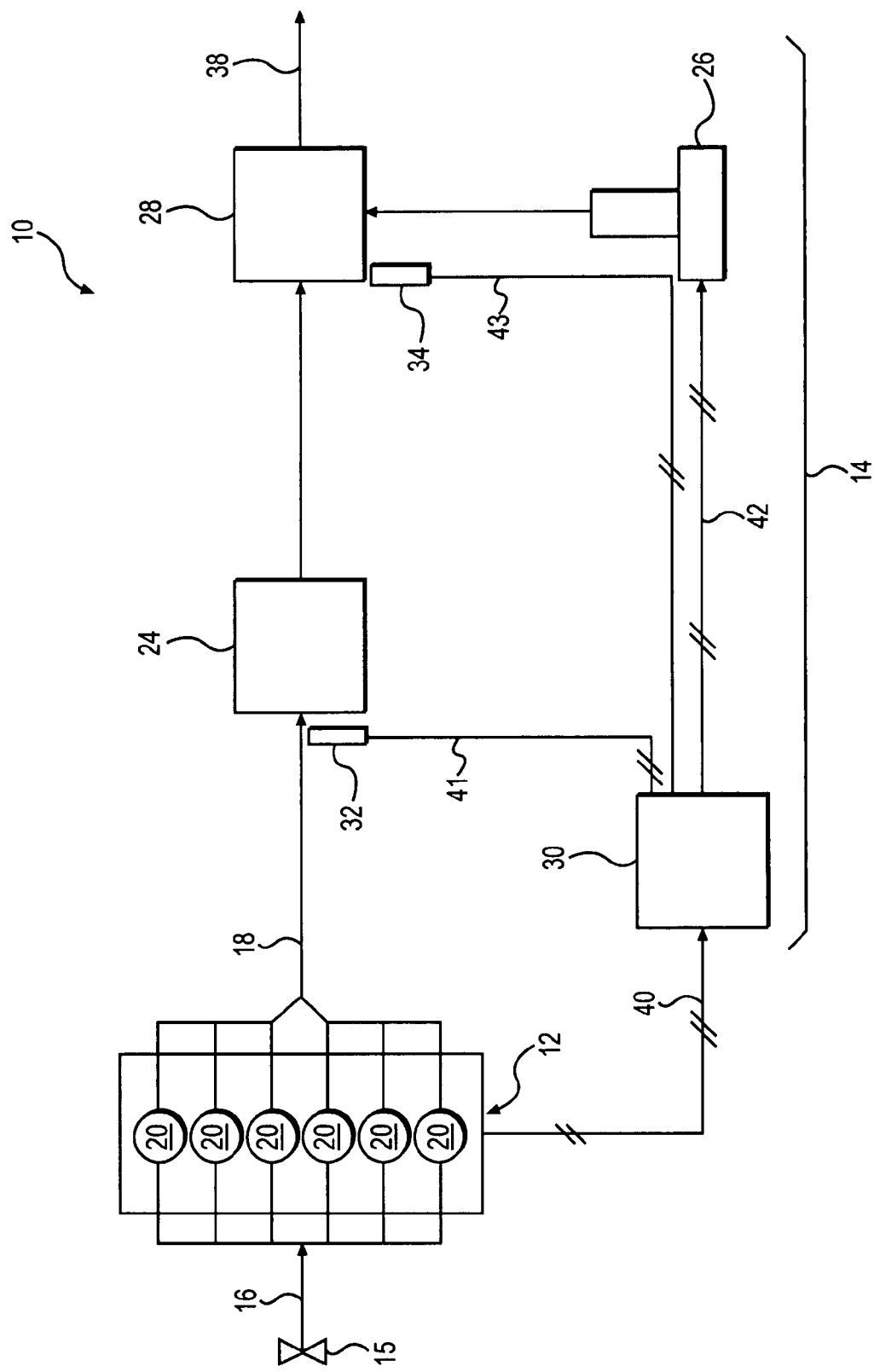
FIG. 1 is a diagrammatic illustration of an exemplary disclosed fluid system.

FIG. 1 illustrates a diagrammatic representation of a fluid system 10, including a power source 12 and an emissions control system 14. Power source 12 may embody a combustion engine, such as, for example, a diesel engine, a gasoline engine, a gaseous fuel-powered engine (e.g., a natural gas engine), or any other type of combustion engine known to one skilled in the art. Power source 12 may have a plurality of combustion chambers 20 that convert potential chemical energy (usually in the form of a combustible gas) into useful mechanical work. It is also considered that power source 12 may embody a furnace or a similar non-engine device. Power source 12 may receive air via a passageway 16 and may output an exhaust flow via a passageway 18.

Air may enter fluid system 10 via an induction valve 15. Induction valve 15 may embody a butterfly valve, a gate valve, a ball valve, a globe valve, or any other type of valve known in the art. Induction valve 15 may be solenoid-actuated, hydraulically-actuated, pneumatically-actuated, or actuated in any other manner. Induction valve 15 may fluidly communicate with passageway 16 to direct air through an intake manifold (not shown) and into power source 12.

Emissions control system 14 may reduce emissions of harmful gasses and particulate matter emitted from power source 12 after a combustion process. Emissions control system 14 may include a filtering device 24, an injector 26, a selective catalytic reduction ("SCR") device 28, a first sensor 32, a second sensor 34, and a controller 30. It is contemplated that emissions control system 14 may include other devices, such as, for example, a diesel oxidation catalyst, an ammonia oxidation catalyst, additional injectors and/or filters, and other devices known in the art.

Filtering device 24 may filter particulate matter, soot, and/or chemicals from the exhaust flow before the flow is released into the atmosphere via a passageway 38. Filtering device 24 may embody, for example, a diesel particulate filter, a catalyzed diesel particulate filter, a diesel oxidation catalyst, a CRT™, or a CCRT™. Filtering device 24 may contain filtering elements (not shown), arranged in a honeycomb, mesh, and/or other suitable configuration. The filtering elements of filtering device 24 may be composed of any appropriate filter material known in the art, such as, for example, foam cordierite, sintered metal, paper, ceramic, silicon carbide, or any combination thereof.

The filtering elements of filtering device 24 may also have an active catalyst layer comprised of any suitable catalytic material, such as, for example, platinum, aluminum, palladium, rhodium, barium, cerium, alkali metals, alkaline-earth metals, rare-earth metals, or any combinations thereof. As the exhaust flow interacts with the catalyst, hydrocarbons and/or other chemicals in the exhaust flow may be oxidized. The catalyst material in filtering device 24 may also increase the amount of $NO_2$ in the exhaust flow to improve a passive regeneration capacity and an NOx reduction efficiency. It is also considered that filtering device 24 may be passively or actively regenerated to remove the particulate matter from the filtering elements of filtering device 24.

It is contemplated that filtering device 24 may have thermal properties (e.g., heat capacity/specific heat, density, and/or thermal conductivity) that create a thermal inertia. The thermal inertia of filtering device 24 may be sufficient to at least temporarily delay the full magnitude of a temperature change in the exhaust flow upstream of filtering device 24 from reaching SCR device 28.

SCR device 28 may be a flow-through device configured to catalyze a reaction between exhaust NOx and a reduction agent. SCR device 28 may include a catalyst, or specifically, a catalyst support material and a metal promoter dispersed within the catalyst support material. The catalyst support material may include at least one of alumina, zeolite, aluminophosphates, hexyluminates, aluminosilicates, zirconates, titanosilicates, and titanates. In one embodiment, the catalyst support material may include at least one of alumina and zeolite, and the metal promoter may include silver metal. Combinations of these materials may be used, and the catalyst material may be chosen based on the type of fuel used, the ethanol additive used, the air to fuel-vapor ratio desired, and/or for conformity with environmental standards.

Injector 26 may inject a reduction agent to dose the surface of SCR device 28. Injector 26 may be located at or upstream of SCR device 28 and may embody any type of fluid injector known in the art. Injector 26 may fluidly communicate with a reduction agent supply tank (not shown) to provide for repeated injections of the reduction agent. The reduction agent may be, for example, gaseous ammonia, ammonia in aqueous solution, aqueous urea, or ammonia from an ammonia generator (not shown).

First and second sensors 32 and 34 may be devices configured to measure temperature changes in fluid system 10. It is contemplated that first and second sensors 32 and 34 may be, for example, thermocouples, fiber optic devices, infrared devices, or any other type of temperature sensing device known in the art. First sensor 32 may be located at or upstream of filtering device 24 and may be configured to measure a temperature change approaching SCR device 28. For example, first sensor 32 may be located at an inlet of filtering device 24, at a location along the length of passageway 18, or at an outlet of power source 12. Second sensor 34 may be located at or upstream of SCR device 28 but downstream of filtering device 24. Second sensor 34 may be configured to measure a temperature of the SCR catalyst or the exhaust flow near the SCR catalyst.

Controller 30 may embody a single microprocessor or multiple microprocessors that include a means for controlling an amount of reduction agent injected by injector 26. Numerous commercially available microprocessors may be configured to perform the functions of controller 30. It should be appreciated that controller 30 may readily embody a general machine microprocessor capable of controlling numerous machine functions. In addition, various other circuits may be associated with controller 30, such as power supply circuitry, signal conditioning circuitry, data acquisition circuitry, signal output circuitry, signal amplification circuitry, and other types of circuitry known in the art. Controller 30 may communicate with power source 12 via a communication line 40, first sensor 32 via a communication line 41, injector 26 via a communication line 42, and second sensor 34 via a communication line 43. It is contemplated that controller 30 may communicate with other machine sensors (not shown), such as NOx sensors, $NH_3$ sensors, mass flow rate sensors, and/or any other fluid system sensors that may provide information related to the operational characteristics of emissions control system 14.

Figure 2:
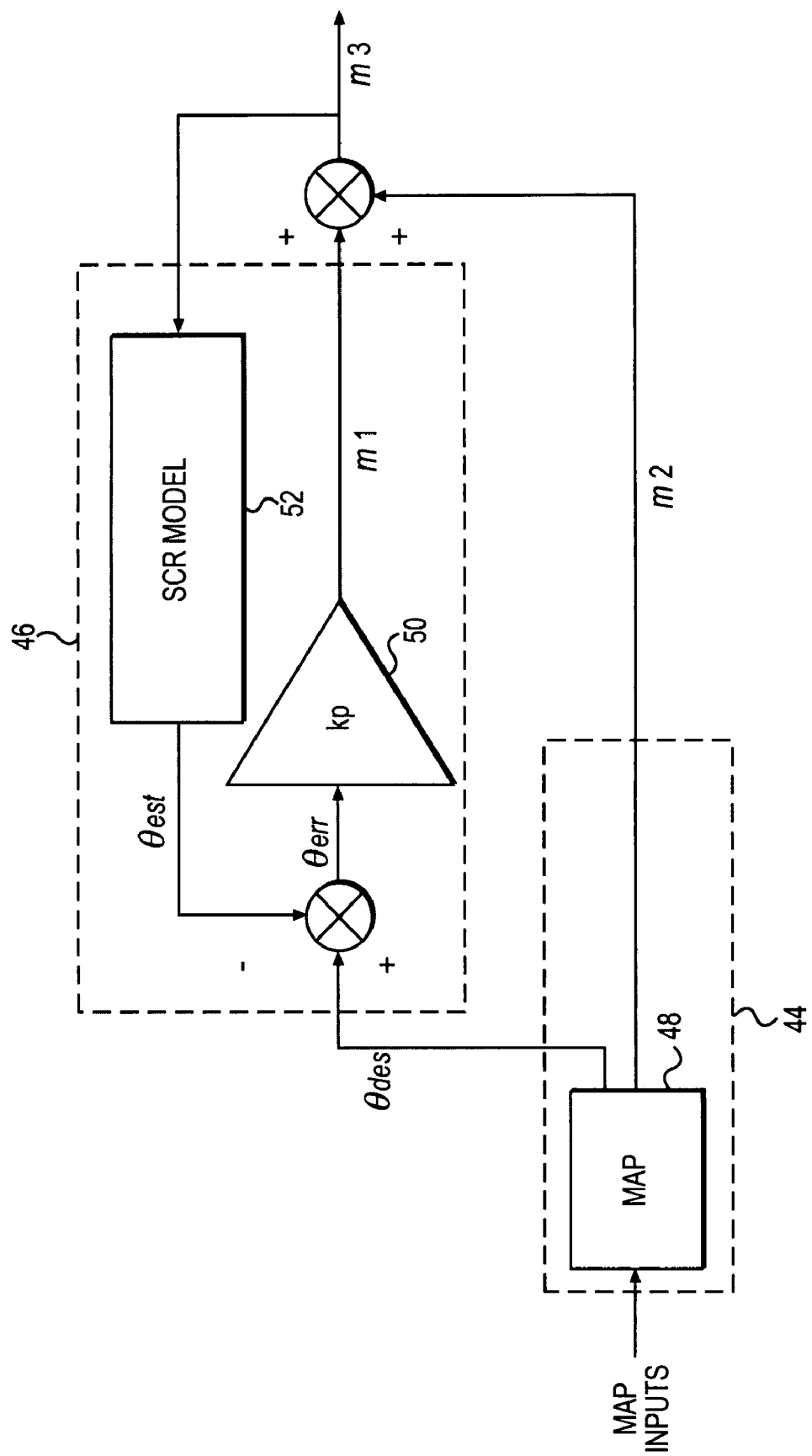
FIG. 2 is a control diagram depicting an exemplary operation of a controller used in the disclosed control system of FIG. 1.

As shown in FIG. 2, controller 30 may include internal logic/programming that allows it to calculate one or more outputs, given one or more inputs. For example, controller 30 may include programming defining a first feedforward control structure 46. First feedforward control structure 46 may be a model-based control structure, such as, for example, a virtual state feedback controller with a proportional gain 50 and an SCR model 52. SCR model 52 may include solutions to a plurality of differential equations that describe the SCR process (including Reactions (1)-(5)). The plurality of differential equations may include rate equations, thermal and mass transport equations, and other equations well known in the art. SCR model 52 may output θest. In general, the catalyst surface coverage θ may be the fraction of active sites on the surface of the SCR catalyst that are covered by $NH_3$ molecules. θest may correspond to an estimated amount of reduction agent stored on the SCR catalyst. SCR model 52 may calculate θest by, for example, tracking an amount of reduction agent previously injected by injector 26 and/or by calculating an amount of reduction agent needed and/or already used for reaction with NOx. It is contemplated that first feedforward control structure 46 may have one or more inputs and one or more outputs. One of the inputs to first feedforward control structure 46 may be a desired catalyst surface coverage, θdes, which may be obtained from a second feedforward control structure 44. One of the outputs of first feedforward control structure 46 may be a first injection amount m1.

Controller 30 may also include programming defining second feedforward control structure 44. Second feedforward control structure 44 may be, for example, a map-based control structure. Second feedforward control structure 44 may utilize one or more multi-dimensional maps 48 stored within the memory of controller 30. Maps 48 may be generated from steady-state simulations and/or empirical data and may include equations, graphs and/or tables related to the operational characteristics of fluid system 10. For example, maps 48 may include equations, graphs and/or tables that relate the SCR catalyst temperature (either measured or predicted) to an ability of the SCR catalyst to store reduction agent.

Maps 48 may have multiple inputs, such as, for example, a first temperature $T_1$ and a second temperature $T_2$ measured by first sensor 32 and second sensor 34, respectively. Controller 30 may use $T_1$ and $T_2$ to identify a change in temperature approaching SCR device 28 and respond appropriately to avoid slip (e.g., controller 30 may decrease the amount of injected reduction agent when a temperature increase is identified). In one embodiment, $T_1$ and $T_2$ may be combined and input into maps 48 as a characteristic catalyst temperature $T_c$. The characteristic catalyst temperature may be calculated, for example, by using a weighted average. It is contemplated that the weighted average may be scheduled in the following fashion:

$$T_c = \begin{cases} aT_1 + (1+a)T_2 & \text{when } T_1 > T_2 \\ T_2 & \text{when } T_1 < T_2, \end{cases} \quad (6)$$

where a is a weighting factor (the value of a may be less than 1, thereby assigning $T_1$ and $T_2$ fractional weighting factors that add up to a value of one). As shown in Equation (6), the value of a may be set to zero when $T_1$ is less than $T_2$. The value a may also be optimized to get the best trade off between $NH_3$ slip control and NOx conversion. It is contemplated that other formulations and weighting schedules may be used and that maps 48 may include other inputs, such as, a space velocity and a $NO_2$/NOx ratio at an SCR device inlet.

The outputs of maps 48 may include θdes and a second injection amount of reduction agent m2. θdes may correspond to the ability of the SCR catalyst to store reduction agent. θdes may be compared to θest to determine θerr (θerr may be the surface coverage error that controller 30 may attempt to minimize).

The second injection amount m2 may be combined with the first injection amount m1 to create a third injection amount m3. In other words, m2 may be a base injection amount that is modified by m1 (m1 may be either positive or negative) to arrive at m3. Controller 30 may thereafter command injector 26 to inject m3. It is contemplated that each injection amount may be a function of time (i.e., an injection rate). It is further contemplated that controller 30 may implement other control structures and/or methods in place of or in addition to first feedforward control structure 46 and second feedforward control structure 44.

INDUSTRIAL APPLICABILITY

The disclosed control system may be applicable to any fluid system where control of an SCR process is desired. Specifically, the disclosed control system may have a controller that identifies a temperature change approaching an SCR device by measuring a temperature at or upstream of a filtering device. The disclosed control system may use the identified temperature change to predict a change in an ability of the SCR catalyst to store reduction agent and thus help limit the amount of pollutants in the exhaust flow while also limiting slip.

Referring to FIG. 1, atmospheric air may be drawn into fluid system 10 via induction valve 15 and communicated via passageway 16 to power source 12. Fuel may be mixed with the air before entering combustion chambers 20, and the fuel-air mixture may be combusted by power source 12 to produce mechanical work and an exhaust flow. The exhaust flow may contain a complex mixture of air pollutants and particulate matter.

The exhaust flow may be communicated via passageway 18 to filtering device 24. In one embodiment, first sensor 32 may be located at the inlet of filtering device 24 and may there measure the first temperature. While inside filtering device 24, the exhaust flow may pass through the one or more filtering elements to remove particulate matter from the exhaust flow. The exhaust flow may also pass through the catalyst layers of filtering device 24, thus causing hydrocarbons and/or other chemicals in the exhaust flow to be oxidized. The particulate matter deposited on the filtering elements of filtering device 24 may be passively or actively regenerated.

The exhaust flow exiting filtering device 24 may be communicated to SCR device 28 to reduce NOx in the exhaust flow. Second sensor 34 may be located at or upstream of SCR device 28 (but downstream of filtering device 24) to measure $T_2$. Controller 30 may be configured to command injector 26 to inject reduction agent into the exhaust flow (at or upstream of SCR device 28). Controller 30 may include programming that allows it to selectively actuate injector 26.

Referring to FIG. 2, during operation of controller 30 second feedforward control structure 44 may receive one or more inputs, such as, for example, a first temperature $T_1$ and a second temperature $T_2$ (it is contemplated that the first and second temperatures may be combined into a single input using Equation (6)). The second feedforward control structure inputs may be referenced to maps 48 to obtain θdes and m2. θdes may then be fed into first feedforward control structure 46 where it may be compared to θest to obtain θerr. θerr may be multiplied by proportional gain 50, to obtain m1. The first injection amount m1 may then be summed with m2 to obtain m3, the third injection amount of reduction agent. The value of m3 may be communicated via communication line 42 (referring to FIG. 1) to injector 26, where it may be applied by injector 26. The value of m3 may also be fed back into SCR model 52 to allow for calculation of a new value of θest, and ultimately a new value of m3.

After the reduction agent is injected by injector 26 it may be stored on the surface of the SCR catalyst, where it may be available for reaction with the NOx in the exhaust flow. When the reduction agent is a compound such as urea, it may undergo a hydrolysis process prior to being stored on the surface of the SCR catalyst. During the hydrolysis process, the urea may decompose into byproducts, including, for example, gaseous $NH_3$ and carbon dioxide.

Figure 3:
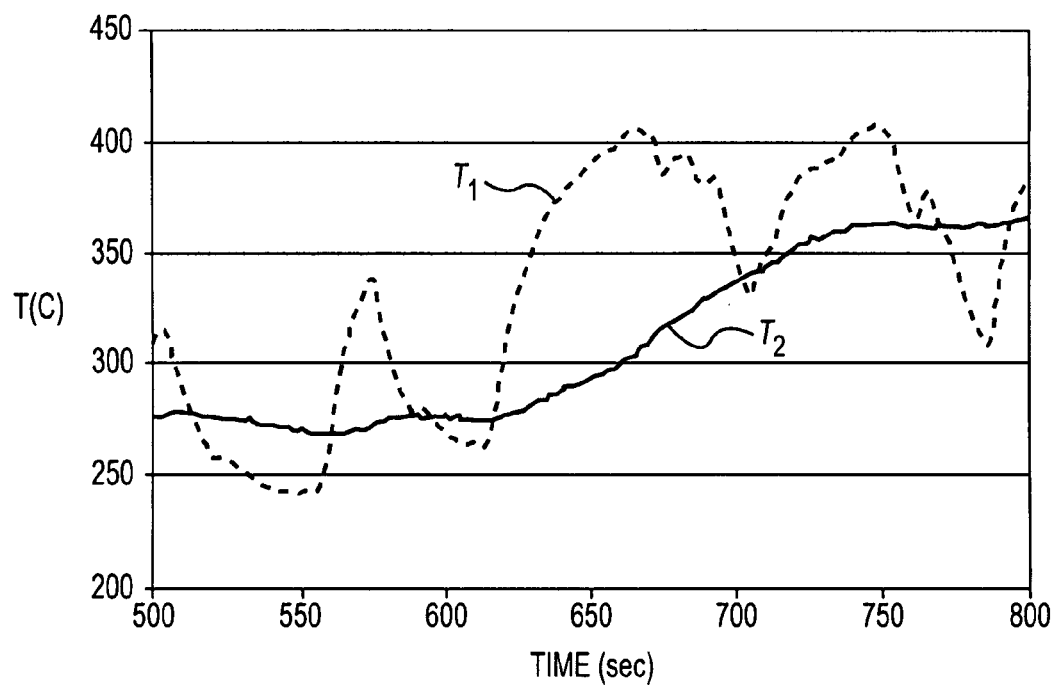
FIG. 3 is a graph of exemplary temperatures measured at or upstream of a filtering device and a catalyst used in the fluid system of FIG. 1.

During operation of emissions control system 14, the speed and/or load of power source 12 may increase or modulate with an overall trend of increasing. The increase in the speed and/or load of power source 12 may cause an increase in the temperature of the exhaust gas and thus an increase in $T_1$. The exhaust gas may then pass through filtering device 24, where, as shown in FIG. 3, the thermal inertia of filtering device 24 may create a delay or lag between the increase in $T_1$ and an increase in $T_2$. In other words, the thermal energy in the exhaust gas may be transferred to filtering device 24, thus cooling the exhaust gas before it is communicated to SCR device 28. The thermal properties of filtering device 24 may be such that a significant amount of thermal energy may be stored in filtering device 24 before an equilibrium temperature is reached between it and the exhaust gas (i.e., before the SCR device 28 receives the full magnitude of the temperature change in the exhaust gas). The value of $T_1$, alone or in combination with $T_2$ according to Equation (6), may be used by controller 30 to predict an or a change in an ability of the SCR catalyst to store reduction agent. Controller 30 may output a decreased the value of θdes and/or m2, and by decreasing θdes and/or m2, controller 30 may decrease m3 before the temperature change reduces the actual ability of the SCR catalyst to store reduction agent sufficiently to cause slip.

Figure 4:
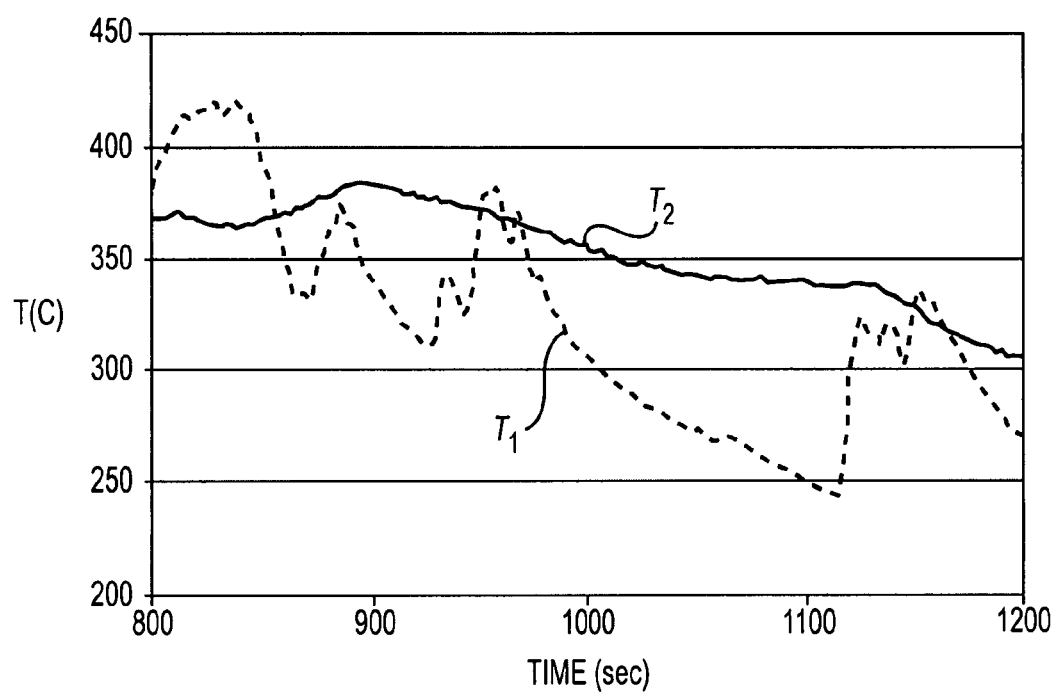
FIG. 4 is another graph of exemplary temperatures measured at or upstream of a filtering device and a catalyst used in the fluid system of FIG. 1.

During operation of emissions control system 14 the speed and/or load of power source 12 may also decrease or modulate with an overall trend of decreasing. The decrease in the speed and/or load of power source 12 may cause a decrease in the temperature of the exhaust gas and thus a decrease in $T_1$. Similar to the case of the increasing exhaust flow temperature, the thermal inertia of filtering device 24 may, as shown in FIG. 4, cause a delay or lag between the decrease in $T_1$ and a decrease in the temperature of $T_2$. However, unlike the case of the increasing exhaust flow temperature, controller 30 may use $T_2$ (e.g., per Equation (6)) to determine the value of θdes and/or m2 rather than both $T_1$ and $T_2$. Thus, under decreasing temperature conditions, controller 30 may dose the SCR catalyst with reduction agent only when the SCR catalyst is presently able to absorb the reduction agent without resultant slip.

It is contemplated that the thermal inertia of filtering device 24 may be optimized to balance the cold start performance of SCR device 28 while still creating a delay that is sufficiently long to allow controller 30 to predict and account for approaching temperature changes.

Several advantages of the disclosed control system may be realized. In particular, the disclosed control system may have a controller that predicts a change in an ability of the SCR catalyst to store reduction agent by measuring a temperature at or upstream of a filtering device. The disclosed control system may use the predicted change in the storage ability of the SCR catalyst to decrease or stop injection of reduction agent before a temperature increase reaches the SCR device. The disclosed control system may also prevent increased injection of reduction agent until a temperature decrease reaches the SCR device.

It will be apparent to those skilled in the art that various modifications and variations can be made to the disclosed control system. Other embodiments will be apparent to those skilled in the art from consideration of the specification and practice of the disclosed control system. It is intended that the specification and examples be considered as exemplary only, with a true scope being indicated by the following claims and their equivalents.

What is claimed is:

1. An emissions control system, comprising:
 a power source that creates a flow of exhaust;
 a filtering device that receives the flow of exhaust;
 a first sensor located at or upstream of the filtering device, the first sensor being configured to measure a first temperature;
 an SCR catalyst located downstream of the filtering device;
 an injector configured to inject a reduction agent into the flow of exhaust in the presence of the SCR catalyst;
 a second sensor located at or upstream of the SCR catalyst and downstream of the filtering device, wherein the second sensor measures a second temperature; and
 a controller in communication with the first sensor, the controller configured to:
  predict a change in an ability of the SCR catalyst to store reduction agent using a measured change in a characteristic temperature; and
  adjust the injector according to the predicted change in the storage ability of the SCR catalyst,
 wherein the controller uses the first temperature and the second temperature to calculate the characteristic temperature.

2. The emissions control system of claim 1, wherein the controller uses the predicted change in the storage ability of the SCR catalyst to determine an amount of reduction agent that will reduce NOx in the flow of exhaust while minimizing slip of the reduction agent.

3. The emissions control system of claim 2, wherein a measured change in the first temperature is created by varying at least one of a speed or a load of the power source.

4. The emissions control system of claim 1, wherein the controller includes a feed-forward control structure.

5. The emissions control system of claim 1, wherein the first sensor is located at an inlet of the filtering device.

6. A method of controlling an SCR process, comprising:
creating a flow of exhaust;
communicating the flow of exhaust to a filtering device;
measuring a first temperature at or upstream of the filtering device;
measuring a second temperature at or upstream of an SCR catalyst, but downstream of the filtering device;
injecting a reduction agent for reaction with the flow of exhaust in the presence of the SCR catalyst, wherein the SCR catalyst is located downstream of the filtering device;
predicting a change in an ability of the SCR catalyst to store reduction agent using a measured change in a characteristic temperature calculated using the first temperature and the second temperature; and
controlling the injection of the reduction agent according to the predicted change in the storage ability of the SCR catalyst.

7. The method of claim 6, wherein the predicted change in the storage ability of the SCR catalyst is used to calculate an amount of reduction agent that will reduce NOx in the flow of exhaust while minimizing slip of the reduction agent.

8. The method of claim 6, wherein controlling further includes decreasing or stopping injection of the reduction agent before a temperature increase reaches the SCR catalyst.

9. The method of claim 6, wherein controlling further includes preventing increased injection of the reduction agent until a temperature decrease reaches the SCR catalyst.

10. The method of claim 7, wherein the calculation is performed by a model-based controller.

11. The method of claim 10, wherein the controller includes at least one feed-forward control structure.

12. The method of claim 6, further including:
a first weighting factor associated with the first temperature; and
a second weighting factor associated with the second temperature, the characteristic temperature being calculated by multiplying the first temperature by the first weighting factor and the second temperature by the second weighting factor.

13. The method of claim 12, wherein a value of zero is used for the first weighting factor when the first temperature is less than the second temperature.

14. The method of claim 6, wherein the flow of exhaust is created by a power source and the temperature change is created by varying at least one of a speed or a load of the power source.

15. The method of claim 6, wherein the first temperature is measured at an inlet of the filtering device.

16. A fluid system, comprising:
a power source with variable load and speed capabilities;
an intake passageway for communicating air into the power source;
a flow of exhaust produced by the power source, the flow of exhaust having a variable temperature and flow velocity;
an exhaust passageway for conveying a flow of exhaust away from the power source;
a diesel particulate filter located in the exhaust passageway;
a first sensor located at the diesel particulate filter, the first sensor being configured to measure a first temperature;
a catalyst located downstream of the diesel particulate filter;
an injector configured to inject a reduction agent into the flow of exhaust in the presence of the catalyst;
a second sensor located at or upstream of the catalyst and downstream of the filtering device, wherein the second sensor measures a second temperature; and
a controller in communication with the first sensor, the controller configured to:
predict a change in an ability of the catalyst to store reduction agent using a measured change in a characteristic temperature; and
control the injector according to the predicted change in the storage ability of the catalyst,
wherein the controller uses the first temperature and the second temperature to calculate the characteristic temperature.

17. The fluid system of claim 16, wherein:
the catalyst comprises an SCR catalyst; and
the predicted change in the storage ability of the SCR catalyst is used to calculate an amount of reduction agent that will reduce NOx in the flow of exhaust while minimizing slip of the reduction agent.

18. The fluid system of claim 17, wherein controlling the injector further includes:
decreasing or stopping injection of the reduction agent before a temperature increase reaches the SCR catalyst; and
preventing increased injection of the reduction agent until a temperature decrease reaches the SCR catalyst.

* * * * *